United States Patent [19]
Jenkins et al.

[11] 3,781,100
[45] Dec. 25, 1973

[54] MOTION PICTURE CAMERA DRIVE MECHANISM

[75] Inventors: Gerald L. Jenkins; Vernon H. Jungjohann; Edgar S. Marvin, all of Rochester; Neil G. Seely, Brockport, all of N.Y.

[73] Assignee: Eastman Kodak Company, Rochester, N.Y.

[22] Filed: Sept. 15, 1972

[21] Appl. No.: 289,517

Related U.S. Application Data

[62] Division of Ser. No. 168,221, Aug. 2, 1971, Pat. No. 3,724,937.

[52] U.S. Cl. .................. 352/180, 352/141, 352/168
[51] Int. Cl. .......................................... G03b 21/48
[58] Field of Search .................... 352/180, 141, 168, 352/166

[56] References Cited
UNITED STATES PATENTS

| 1,905,522 | 4/1933 | Stephenson | 352/180 X |
| 3,261,654 | 7/1966 | Faber | 352/180 X |

Primary Examiner—Monroe H. Hayes
Attorney—William J. Kline et al.

[57] ABSTRACT

A motion picture camera drive mechanism includes a single motor which is used for driving (separately or simultaneously) a film pull down mechanism which advances film past an exposure aperture and a mechanism for adjusting at least one lens element in a zoom lens system. When the camera drive mechanism is to be energized, provision is made for first energizing a circuit to an automatic exposure control system and then operating the film pull down mechanism, thereby effecting correct exposure of the first frame of film.

3 Claims, 10 Drawing Figures

MOTION PICTURE CAMERA DRIVE MECHANISM

This application is a division of application Ser. No. 168,221, filed Aug. 2, 1971, now Pat. No. 3,724,937.

BACKGROUND OF THE INVENTION

1. Field of the Invention

This invention relates generally to drive mechanisms for motion picture cameras or the like and, more specifically, to such a drive mechanism which utilizes a single motor for simultaneously or independently driving both the film advancing mechanism and an adjustable zoom lens system.

2. Description of the Prior Art

Various mechanisms for driving a film pull down claw and adjusting a zoom lens in a motion picture camera are well known to the art. For example, U.S. Pat. No. 2,995,061 entitled "Mechanism for Adjusting Zoom Lens Assembly", issued Aug. 8, 1961 to Briskin et al. discloses a camera with a zoom lens assembly wherein the zoom lens is driven in one direction by engaging a first gear with a rack coupled to a movable element of a zoom lens. The zoom lens is driven in the opposite direction by engaging a second gear with the rack. This patent also discloses alternate means for effecting manual adjustment of the zoom lens system independently of the motor, thereby permitting non-powered adjustment of the zoom lens system when the film pull down mechanism is not being operated. U.S. Pat. No. 3,157,881 for Zoom Lens Drive Mechanisms for Photographic Cameras, issued to G. L. Jenkins et al. on Nov. 17, 1964, relates to a drive mechanism for both a film pull down or advance device and zoom lens adjusting means for a motion picture camera. The device disclosed in the Jenkins et al. patent drives both the film advance mechanism and the lens adjustment mechanism from a single motor, and uses a slip clutch between the motor and drive for the pull down mechanism to permit separate and independent operation of the zoom mechanism from the camera motor during periods when film is not being advanced through the camera. Also, U.S. Pat. No. 3,106,125 for a Zoom Lens Drive Mechanism, issued Oct. 8, 1963 to W. A. Martin et al. discloses another motion picture camera having a single drive motor for operating both the zoom lens mechanism and film advance means in the camera. The mechanism disclosed in the latter patent utilizes a pair of arms linked to the adjustable lens in a zoom lens system, and cam followers on the arms which are selectively engaged in spiral grooves on opposite faces of a cam rotated by the camera drive motor.

These and other known camera drive mechanisms suffer from one or more disadvantages including, inter alia, the need to provide for separate manual adjustment of the zoom mechanism when the film advance mechanism is not being operated, and the need for specially designed cam mechanisms which complicates the structures and increases the cost of manufacture. In addition, it is desirable in many instances to provide for devices for adjusting the rate of advancement of film through the camera to permit exposure at a so-called normal exposure rate of 18 or 24 frames per second and also at a second slower (or faster) rates to provide for slow motion (or fast motion) operation. In addition, it is desirable that the exposure control system for a camera be energized before the film advance mechanism is initiated in order to insure proper exposure of even the first frame during a sequence of filming. These and other disadvantages have been overcome by the present invention.

SUMMARY OF THE INVENTION

It is an object of the present invention to provide an improved drive mechanism for a motion picture camera having a single motor wherein the zoom lens system and the film advance means in the camera can be operated independently or simultaneously.

A further object of the invention is to provide such a drive mechanism which is easily adjustable to effect two different rates of advance of film through the camera.

Another object of the invention is to provide a drive mechanism for use with a camera having an exposure control system wherein the exposure control system normally is energized first and then, after a slight time delay, the film advance means is energized; and to such a drive mechanism wherein the film advance means can be energized first under certain conditions.

In accordance with a preferred embodiment of the present invention, a drive mechanism is provided for a motion picture camera having a motor adapted to drive a lens system having at least one lens element mounted on the camera for movement along an axis in each of two opposite directions for varying the magnification of the lens system. The camera has film advance means coupled to the motor and adapted to be selectively coupled to the cam for driving the cam and thereby the film advance means. Preferably, the drive means provides for advancement of film at first and second rates, and camera operating means are coupled to the drive means for selectively coupling the first or second drive means with the cam. Other drive means are coupled to the motor and adapted to be coupled to the movable lens element of the lens system. The drive means for the lens system is effective to adjust the movable lens element of the zoom lens system along its axes of movement in each of two opposite directions. Control means are coupled to a lens drive means, and means are provided for effecting operation of the lens drive means from the motor independent of the operation of the drive means for advancing film whereby the lens system can be adjusted from the motor through the third drive means without first coupling the first or second drive means to the motor.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
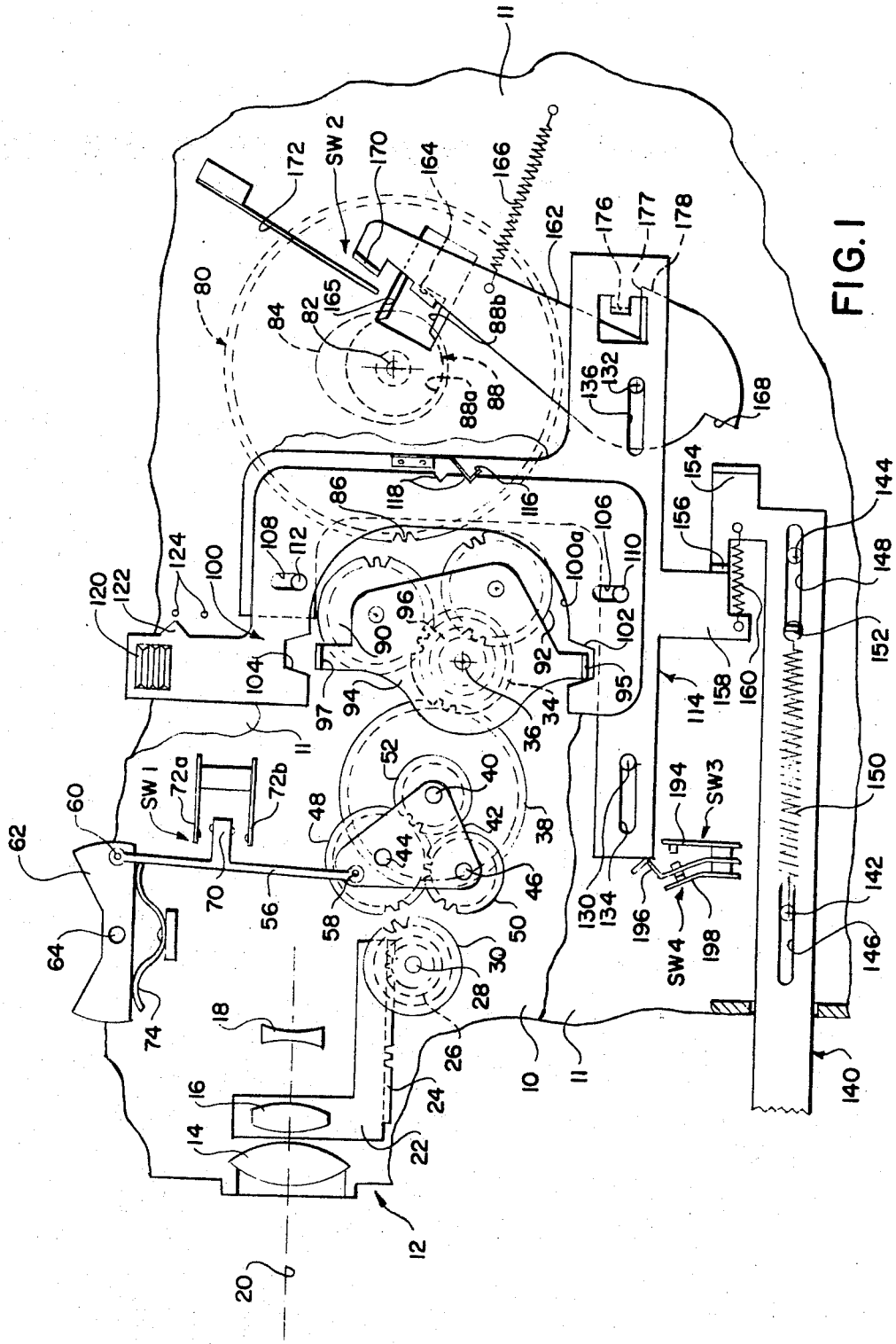
FIG. 1 is a fragmentary elevation view of a motion picture camera illustrating a drive mechanism for a motion picture camera of the present invention and showing the parts in their rest position, i.e., when neither the film advance means nor the drive for the zoom lens system is being operated from the motor.

Because motion picture cameras are well known, the present description will be directed in particular to elements forming part of, or cooperating more directly with, the present invention, elements not specifically shown or described herein being understood to be selectable from those known in the art.

Referring now to the drawings in detail, a motion picture camera incorporating the present invention comprises casing or mechanism plates generally designated 10 and 11. Plate 10 supports a suitable zoom lens system generally designated 12. The lens systems illustrated by way of example comprises three lens elements 14, 16, 18 which define an optical axis 20. The lens element 14 is normally stationary during adjustment of the zoom lens system but may be movable for focusing and certain manufacturing adjustments, if desired. At least one of the elements of the lens systems, for example the element 16, is supported by a lens mount 22 for movement along the optical axis 20 in each of two opposite directions for varying the magnification of the lens system. Lens mount 22 comprises a rack shown generally at 24 and having a plurality of teeth which are adapted to engage with teeth of a gear 26 mounted on a shaft 28. Also mounted on shaft 28 is a second gear 30 which is adapted to be driven from a suitable motor, such as an electric motor 32. The coupling of the motor to the gear 30 is effected by a plurality of gears including a gear 34 mounted on motor shaft 36 which is adapted to mesh with a relatively large gear 38 carried by a shaft 40. Shaft 40 is carried by a generally triangular rocker plate 42 which also carries two shafts 44 and 46 for gears 48 and 50, respectively. Gears 48 and 50 are in meshing engagement with each other, and gear 48 is adapted to be driven from a gear 52 which is mounted on shaft 40 and thereby driven from gear 38. Plate 42 is pivotably movable about the axis of shaft 40 to bring either gear 48 or gear 50 into engagement with gear 30 on shaft 28. Because gear 48 and gear 50 are in engagement with each other, they rotate in opposite directions so that the zoom lens system can be driven in either of two directions by selectively engaging gear 48 or gear 50 with gear 30. A clutch (not shown) can be provided in the gear train between the motor and the adjustable lens element 16 to permit the drive for the element 16 to remain engaged after the element has reached the extreme limits of its movement.

Figure 4:
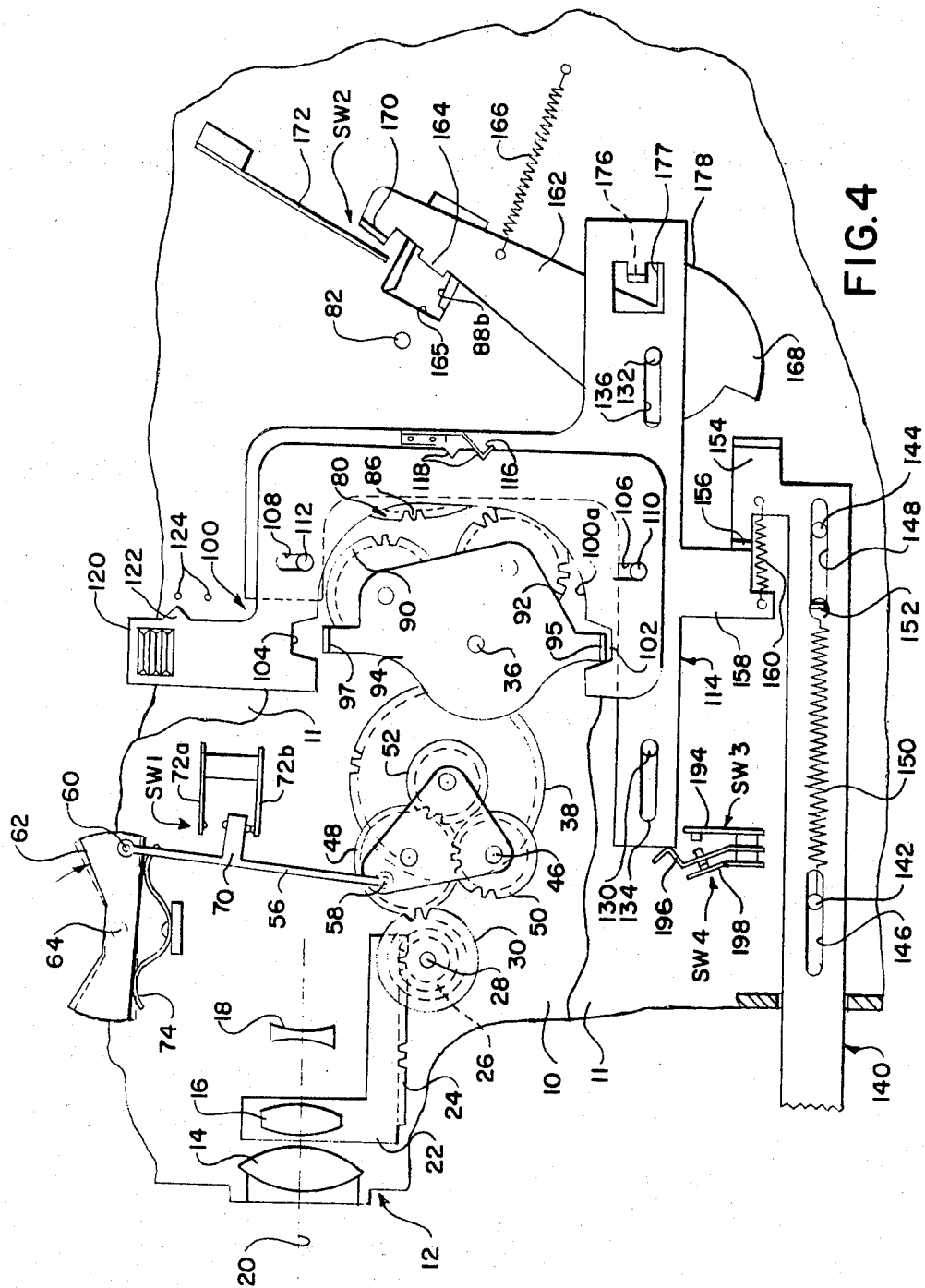
FIG. 4 is a view similar to FIG. 1 but illustrates the coupling of the motor to the zoom lens adjusting apparatus.

The pivotal movement of plate 42 is controlled by means of a rod 56 which has one end portion thereof pivotally connected at 58 to plate 42 in spaced relation to the axis of shaft 40. The other end portion or rod 56 is connected at 60 to an end portion of a lens operating control member 62, the latter being pivoted at 64 to mechanism plate 10. Thus, as shown in FIG. 4, when the right portion of the control member 62 is depressed the plate 42 swings about the axis of shaft 40 to bring gear 48 into engagement with gear 30 to drive the lens element 16 in one direction. Similarly, depression of the left portion of lens control member 62 swings plate 42 in the opposite direction to bring the gear 52 into engagement with the gear 30 thereby to reverse the movement of the movable lens element. Motor 32 can be energized to adjust the lens system independently of operation of the film advance mechanism by closing of a normally open switch designated SW-1. Switch SW-1 includes a movable contact member 70 which is carried by a mid portion of rod 56 and is movable with the rod into engagement with either one of two stationary contacts 72a or 72b. Contacts 72a and 72b are electrically interconnected so that a circuit (described later) can be closed to the motor each time movable contact 70 is brought into engagement with either of the stationary contacts. Switch SW-1 is held in its normally open position by any suitable means, such as by a leaf spring 74 which engages the lens control member 62 to hold it in position shown in FIG. 1, thereby holding the switch in its open position.

The film advance mechanism for the camera includes a cam member shown generally at 80 which is positioned between mechanism plate 10 and 11 and is rotatably mounted on a cam shaft 82. In a manner well known in the art, one face of the cam (the face opposite from that shown in FIGS. 1-6) can include both an edge cam surface 84 and a face cam surface (not shown). The face and edge cams are used for driving a claw in a generally rectangular path so that the claw enters a perforation of a film strip, advances the film strip a predetermined distance relative to an exposure aperture, and then withdraws from the film perforation and enters the next perforation, thereby intermittently advancing the film past the exposure aperture camera. Cam 80 has a plurality of teeth 86 abouts its outer periphery which are adapted to be engaged with gears for driving the cam from motor 32. The face of cam 80 opposite from the face and edge cams has a recess 88 formed therein comprising a generally circular portion 88a which is coaxial with shaft 82 and an elongate extension or projecting portion 88b which communicates with portion 88a but is spaced from the axis of shaft 82 by a distance greater than the radius of circular portion of 88a. The purpose of the recess will be described later.

Cam 80 is coupled to motor 32 by a gear train including two identical gears 90 and 92 which are rotatably mounted on a plate 94 that is pivotal about the axis of shaft 36. The gear are spaced from each other so that they are not in meshing engagement with each other. Gear 90 meshes with gear 34 on the motor shaft 36 and gear 92 meshes with a smaller gear 96 on the motor shaft. Gears 90 and 92 are aligned in a common plane with the teeth 86 on cam 80 so that either gear 90 or gear 92 can be brought into meshing engagement with the teeth on the cam in response to pivotal movement of plate 94. Because gear 96 is smaller in diameter than the gear 34, cam 80 is rotated at a faster rate by gear 90 than by gear 92. Of course, the particular number of rpm's imparted to the cam by each gear can be determined by the gear ratios and motor speed. In a preferred embodiment, gears 90 and 92 are driven at rates which rotate cams 80 to effect operation of the associated film pull down claw (not shown) at rates of either 9 frames per second or 18 frames per second, respectively. Both gears 90 and 92 can be disengaged from gear teeth 86 as shown in FIG. 1 when the camera is not in operation or when film is not being advanced, thereby permitting the single motor 32 to be used for driving the zoom lens mechanism as described hereinbefore. Also, it will be apparent that the zoom lens mechanism can be operated in the manner described even when film is being advanced through the camera since the coupling of the motor to the cam 80 is totally independent of the coupling of the motor to the zoom lens drive system.

Plate 94 has two tabs for lugs 95 and 97 which project outwardly away from the face of the plate opposite from the gears 90 and 92. These tabs are located at the ends of fingers on the plate. A speed control member, generally designated 100, is substantially C-shaped in configuration, having a substantially semicircular opening 100a. Notches 102 and 104 in the speed control member face into opening 100a from opposite sides thereof, and are of sufficient size to receive the tabs 95 and 97, respectively. As is apparent in FIGS. 1–5, the size of the opening 100a is sufficiently large so that only one tab 95 or 97 at a time can be positioned in its respective notch in the control member. However, the control member is adjustable in an up-and-down direction (as viewed in the drawings) so that either of the tabs can be selectively positioned in its respective notch. The mounting of the control member which permits such movement comprises a pair of elongate guide slots 106 and 108 in the control member which receive guide pins 110 and 112, respectively. The guide pins are mounted on and project upwardly from a face of a slider assembly generally designated 114. Control member 100 can be held in either of its two adjusted positions by means of a flexible, generally V-shaped member 116 which is mounted on the slider assembly 114 and which is adapted to engage each of a plurality of notches or detents 118 in a side edge of the control member. The control member can be manually moved by means of a integral knob portion 120 that is conveniently located at the exterior of the camera. Suitable indicators 122 and 124 may be provided to designate to the camera operator the speed at which the camera is set to operate.

Figure 2:
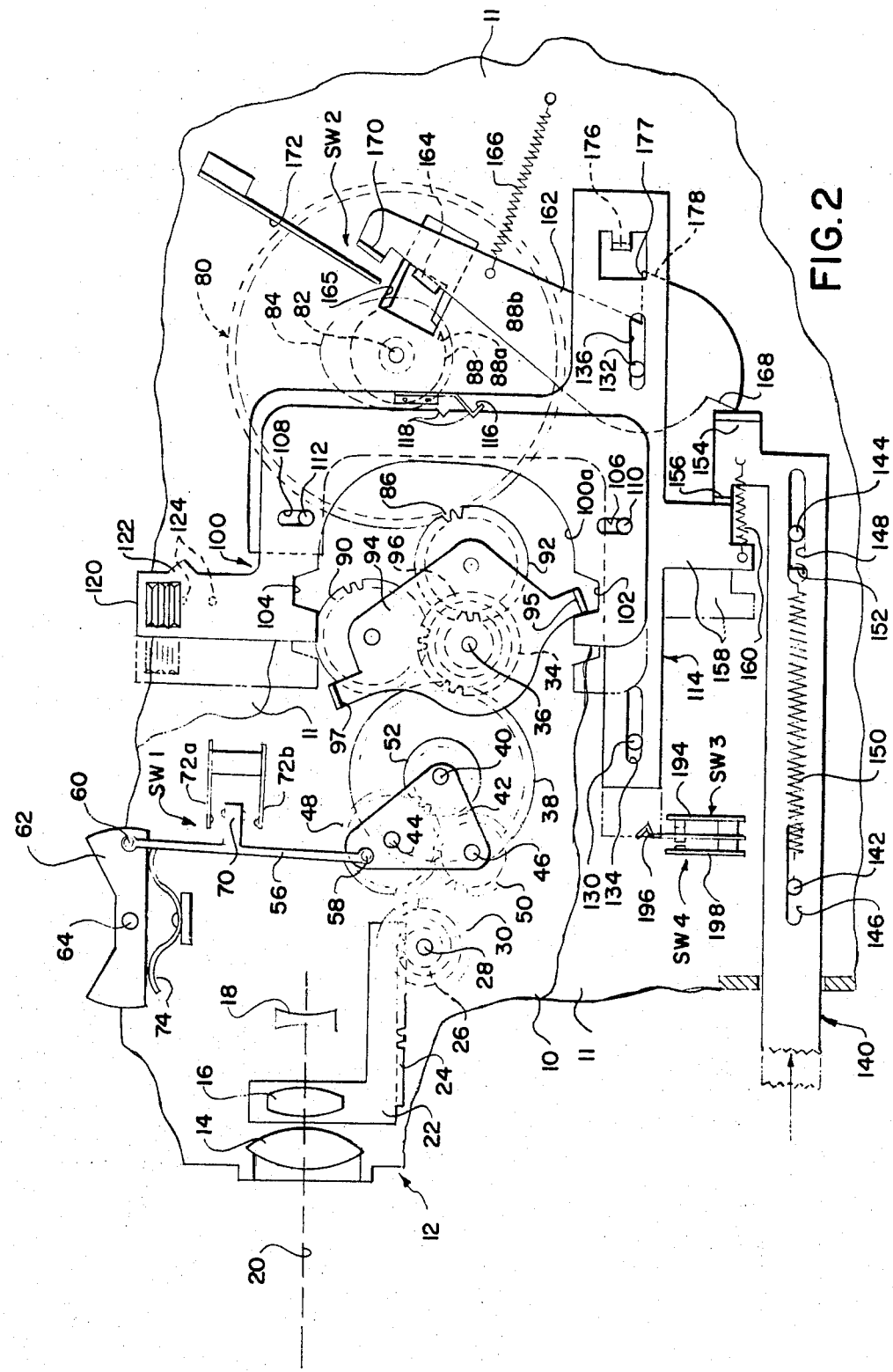
FIG. 2 is a view similar to FIG. 1 but showing certain parts in a moved position effected by the engagement of a camera operating means.
Figure 3:
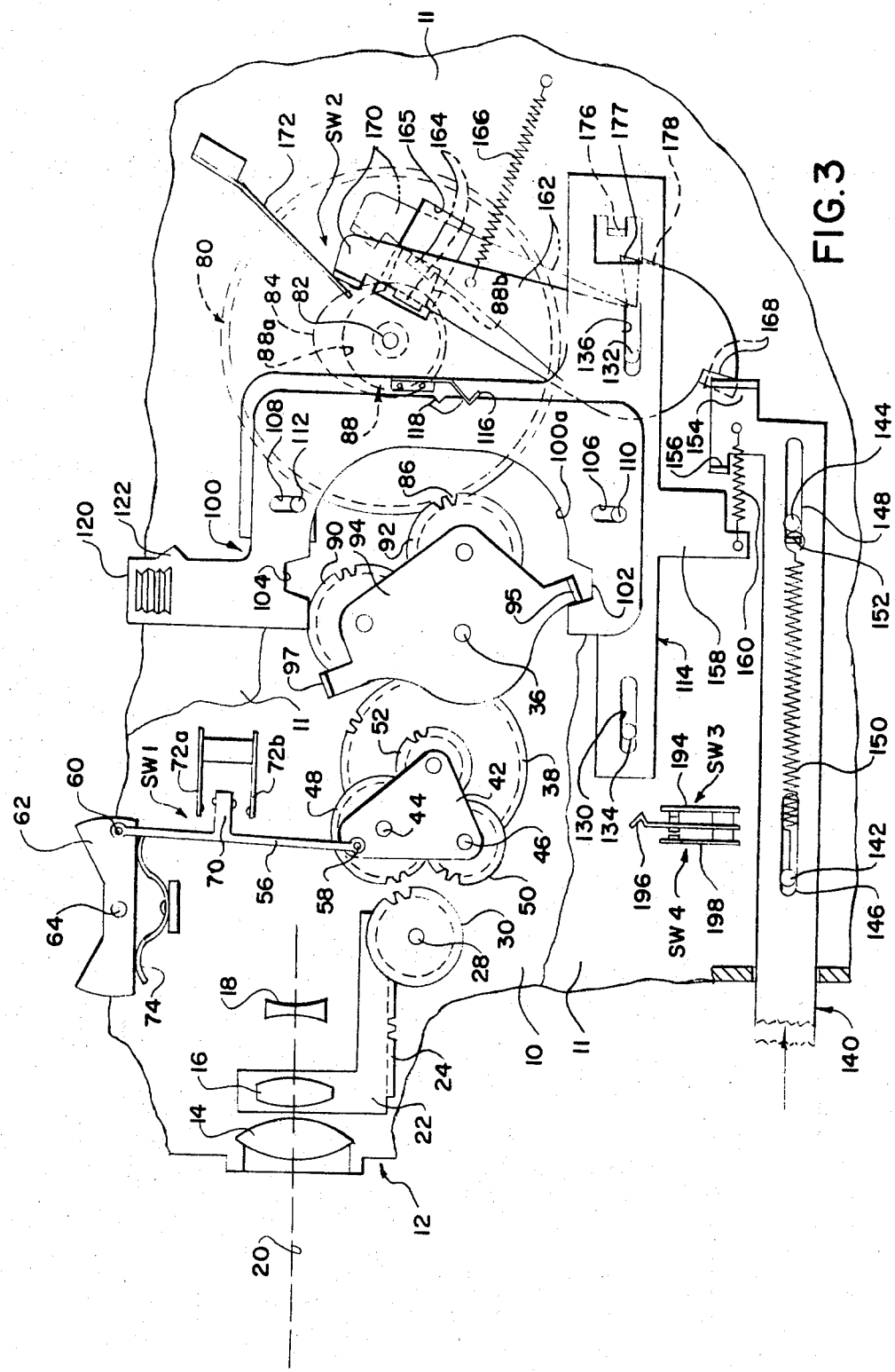
FIG. 3 is a view similar to FIG. 2 but showing the parts in the position assumed after further movement of the camera operating means.

Control member 100 and slider assembly 114 are located above the upper surface of mechanism plate 11. Slider assembly 114 is mounted on mechanism plate 11 by means of two spaced guide pins 130 and 132 which project from plate 11 into two elongate guide slots 134 and 136, respectively in the slider assembly. This mounting permits the entire assembly 114 with the control member 100 thereon to be shifted to the right from the position shown in FIG. 1 through the position shown in FIG. 2 to the position shown in FIG. 3. During such movement of assembly 114 control member 100 engages one or the other of the tabs 95 or 97 to effect pivotal movement of plate 94 and thereby bringing one of the gears 90 or 92 into meshing engagement with the gear teeth 86 on the cam. This is illustrated in FIGS. 1–3 for movement of gear 92 into engagement with cam gear teeth. Gear 90 is moved into engagement with the cam gear teeth by shifting control member 100 downwardly from its FIG. 1 position and then moving slider assembly 114 to the right.

In order to initiate advancement of film through the camera the camera operator moves a trigger lever 140 to the right as viewed in the drawings. This can be effected by manually depressing the left end portion of the lever which is conveniently located at the exterior of the camera. Lever 140 is mounted for sliding movement with respect to the mechanism plate 11 by a pair of mounting pins 142 and 144 on plate 11 which project upwardly into elongate slots 146 and 148, respectively, in lever 140. Lever 140 is urged to the position as shown in FIG. 1 by a tension spring 150 which is stretched between the pin 142 and a tab 152 on the lever.

Lever 140 has a finger portion 154 at its right end that is offset upwardly from other portions of the lever, and a lug 156 on the finger is adapted to engage one side edge of a cooperating, downwardly projecting finger portion 158 on the slider assembly 114. Thus the biasing force of spring 150 is imparted through lug 156 to finger 158 to urge the slider assembly 114 into the position illustrated in FIG. 1. Lever 140 and assembly 114 are resiliently connected together for movement to the right from the FIG. 1 position to the FIG. 3 position by means of a tension spring 160 which is connected to and stretched between the finger portion 154 of lever 140 and the finger portion 158 of assembly 114. Thus depression of trigger 140 (movement to the right) produces a biasing force urging the assembly 114 to the right; however, lever 140 can be moved to the right by the operator without corresponding movement of assembly 114 by simply stretching or further tensioning spring 160.

As is well known in the art, it is desirable to stop the shutter (not shown) of the camera in a position for blocking passage of light from the lens system to film located in the exposure plane of the camera, thereby avoiding continuous exposure of film when the camera is not in use. The illustrated structure for accomplishing this comprises a lever 162 which is mounted on pin 132 beneath slider 114 for pivotal movement about the axis of the pin. Projecting downwardly from one side edge of the lever 162 is a lug 164 which extends through an opening 165 in plate 11 and into the straight portion 88b of the recess in the cam 80 when the parts are positioned as illustrated in FIG. 1. The stop 164 interfers with rotation of the cam, thereby preventing rotation of shaft 82 on which the shutter is mounted. However, movement of stop 164 to the position shown in FIG. 3, where it is in alignment with the circular portion 88a of the recess in the cam, permits unrestricted rotation of the cam (and thus shaft 82) for advancement of the film through the camera. Lever 162 normally is biased to the position shown in FIG. 1 by a spring 166 which is connected to the lever and to plate 11. However, the lever can be swung counterclockwise about the axis of pin 132 in response to engagement between the finger portion of 154 of the trigger lever 140 and a flange portion 168 on the end portion of lever 162 opposite from stop 164. This movement is best illustrated by comparison of the phantom-line and solid-line positions for lever 162 in FIG. 3.

When trigger 140 is released to terminate a filming sequence, rotation of the cam should be continued until the shutter returns to a position along the light path between the lens system of the camera and the film plane. Also, motor 32 should be de-energized when stop 164 is in recess portion 88b. This is accomplished by cooperation between stop 164 and the circular recess 88a, and by operation of a second switch SW-2. Switch SW-2 comprises a first contact member 170 formed by a flange on the end portion of lever 162 and by a flexible switch contact 172 which is connected in a circular to the motor and to a power source as explained later. The contact members 170 and 172 are positioned with respect to each other so that switch SW-2 is closed as stop 164 moves from the recess portion 88b into the circular recess portion 88a so that the switch SW-2 can complete a circuit to the motor to initiate operation of the motor and rotation of the cam at approximately the same time the stop enters the circular recess portion. Operation of the motor will continue until switch SW-2 is opened, and this occurs when (1) trigger finger 154 moves to the left (away from flange 168), and (2) the cam rotates to a position where stop 164 is aligned with the recess 88b, thereby permitting movement of the stop into the elongated recess portion 88b under the biasing force of spring 166.

While stop 164 maintains switch SW-2 in a closed condition until the shutter returns to the correct position for terminating exposure of the film, it is also necessary to maintain engagement between one of the gears 90 and 92 and the gear teeth 86 on the cam after the trigger lever 140 has been released by the camera operator. Failure to do this would result in the motor remaining energized because switch SW-2 was closed, but the motor would be ineffective to continue driving of the cam to bring the stop to the position where it can return to the elongated portion of the recess and thereby shut off the switch in the motor. Engagement between one of the gears 90 and 92 and the gear teeth 86 is assured by maintaining the slider assembly 114 in the position illustrated in FIG. 3. This is accomplished by providing a cam location interlock flange or lug 176 on slider assembly 114 which projects downward from its bottom surface (as illustrated in FIGS. 1–4), and by the provision of a cooperating latching surface 178 on an edge of the lever 162. The lug 176 and latch surface 178 are located with respect to each other so that the slider assembly can be moved freely from the position shown in FIG. 1 to the position shown in FIG. 2 when the lever is in the position illustrated in those views wherein the stop 164 is in the elongate portion 88b of the recess. However, when the lever 162 moves to the position illustrated in FIG. 3, the latch surface 178 swings into the path of movement of the lug 176 to prevent return movement of the slider assembly 114 to the position shown in FIG. 1. This blocking relation ends when the lever 162 returns to its FIG. 1 position, whereby moving surface 178 out of the path of lug 176.

Lever 162 has an edge 177 adjacent latch surface 178 which is positioned with respect to lug 176 to prevent movement of the lever to its FIG. 3 position until the slider moves part of the way from its FIG. 1 position to its FIG. 3 position. This insures the closing of a switch SW-3 (described later) before lever 162 can move to close switch SW-2.

Figure 7:
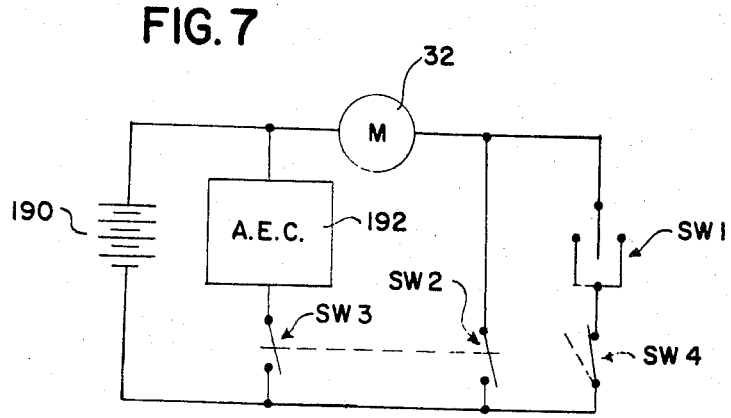
FIG. 7 is an electrical schematic diagram of a control circuit for the mechanism of the invention.

FIG. 7 illustrates an electrical schematic diagram suitable for interconnecting the various electrically controlled portions of the camera to effect the mode of operation described herein. Current is provided from a suitable source of electric power, such as a battery 190. A circuit is coupled from the battery through motor 32 whenever switch SW-2 is closed. Assuming an exposure control system is provided for the camera, it is desirable to energize the exposure control system prior to the time switch SW-2 is closed to begin operation of the pull down mechanism. The switch designated SW-3 is provided for this purpose. The switch is connected in a circuit including battery 190 and the exposure control system designated 192, the circuit being connected in parallel to motor 32 and switch SW-2. The desired sequence of operation is effected by providing for closure of switch SW-3 shortly before closing of switch SW-2. As illustrated in FIGS. 1–4, switch SW-3 includes a fixed contact 194 and a movable contact 196, the switch normally being open when the camera is not being operated due to engagement between the left end of slider assembly 14 and the movable contact 196. As the slider assembly begins its movement from its FIG. 1 to its FIG. 2 position, and before the assembly reaches a position where lug 176 is out of the way of edge 177 of lever 162, the movable contact 196 is closed to the fixed contact 194 to complete the circuit to the exposure control system. This permits correct exposure of the first frame of film.

Switch SW-1 is connected in parallel to switches SW-2 and SW-3 and to the exposure control system 192. Switch SW-1 is connected in a circuit which includes motor 32 and battery 190 so that the closing of switch SW-1 normally operates the motor to drive the gears that can be coupled to the zoom drive mechanism.

In order to facilitate engagement between the gears 90 or 92 and the gear teeth 86 on the cam, it is preferred that the gears not be rotated during the engagement of such gears. This, of course, requires that the motor be de-energized. This is assured by the provision of a switch desigated SW-4 in FIGS. 1–5 and 7 which is normally closed but can be opened just prior to engagement of gears 90 or 92 with the gear teeth on the cam. As shown in FIGS. 1–4, this is accomplished by utilizing the movable contact 196 forming part of switch SW-3 and another fixed contact designated 198, and locating the contact 198 with respect to movable contact 196 so that switch SW-4 is normally closed when the slider assembly is in its FIG. 1 position. Switch SW-4 will remain closed until the slider assembly begins its movement from the FIG. 1 position and reaches its FIG. 2 position at which time the movable contact 196 becomes disengaged from fixed contact 198 and moves in contact with the contact 194 to close switch SW-3. With switch SW-4 open, the motor can only be energized by closing switch SW-2, and this normally does not occur until after the gears 90, 92 mesh with gear teeth 86.

After switch SW-4 opens, and before switch SW-2 closes, there is an instant of time when the camera operator cannot operate the zoom lens drive mechanism even though operator 62 is depressed. This, however, is ordinarily an extremely brief period of time, and may not even be noticed by the camera operator. Thus if the zoom lens drive is engaged and the motor running at the time the operator moves lever 140 to initiate advancement of film, switch SW-4 opens to briefly stop motor 32 but switch SW-2 normally is closed an instant later to again start the motor. Thus if the operator continues to press the zoom control member 62, the zoom lens will momentarily pause and then continue its movement. Of course, after the switch SW-2 is closed, switch SW-4 may remain open since there is no longer any need to use switch SW-1 to adjust the lens system.

In other words, after the motor is energized through switch SW-2, adjustment of the lens system requires only a mechanical operation that is independent of the closing of switch SW-1.

The operation of the camera of the invention will now be summarized. Initially it will be assumed that the various parts are in the position illustrated in FIG. 1 where both the zoom lens drive mechanism and the film advance mechanism are at rest and the exposure control system is de-energized. Thus switches SW-1, SW-2, and SW-3 are open and switch SW-4 is closed. Referring to FIG. 4, if the camera operator wishes to adjust the zoom lens mechanism without effecting advancement of film through the camera, the control member 62 is depressed to rock plate 42 and to close switch SW-1, thereby energizing the motor and driving gears 48 and 50 through the gear train described hereinbefore. The zoom drive mechanism is then driven in either one of two opposite directions, depending upon which one of the gears 48 or 50 is engaged with gear 30. (FIG. 4 illustrates gear 48 engaged with gear 30.) Movement of the zoom lens mechanism continues until the control member is released or until the rack 24 reaches one extreme end of its movement where the clutch (not shown) in the gear train begins to slip.

Assuming now that the various parts are in the position illustrated in FIG. 1 and that the camera operator desires to operate the film pull down mechanism without adjustment of the zoom lens. The operator first determines the rate at which film will be advanced in the camera by moving the speed control member 100 to the position shown in FIGS. 1-5 or to its other position (not shown) wherein tab 97 is positioned within the confines of notch 104. Then the operator depresses the trigger lever 140 to effect its movement from the position shown in FIG. 1 through the position shown in FIG. 2 to the position shown in FIG. 3. As this occurs, spring 160 biases the slider assembly 114 to the right from its FIG. 1 position for opening switch SW-4 and closing switch SW-3, thereby normally to energize the exposure control system before exposure of film begins. This travel of the lever 140 brings the finger portion 154 thereof into engagement with the portion 168 of lever 162 to urge lever 162 about the axis of pin 132. However, movement of the lever 162 cannot occur (due to the tab 176 on the slider assembly) until the slider assembly 114 moves to the right to close switch SW-3. After tab 176 is moved to the right with the slider assembly to the point that permits pivotal movement of the lever 162, the lever swings to the position shown in solid lines in FIG. 3 against the bias of spring 166 to bring the stop 164 out of the elongated portion 88b of the recess and into the circular portion 88a. Simultaneously, switch SW-2 is closed, thereby energizing the motor 32 to drive gears 90 and 92.

As the slider assembly 114 moves to the right it engages one of the tabs 95 or 97 on plate 94, thereby swinging the plate about the axis of shaft 36 to bring gear 92 or gear 90 into engagement with the teeth 86 for driving the film pull down mechanism. Normally, the gears become engaged before the closing of switch SW-2 to avoid any difficulty that might result from trying to mesh gear 90 or 92 while they are rotating and while the gear teeth 86 are stationary. With motor 32 running and film being advanced in the manner described, the camera operator can also operate the zoom mechanism from the motor by manipulating the control membrane 62 to bring gear 48 or 50 into engagement with gear 30. This, can be accomplished even though switch SW-4 is open because the motor 32 is being driven through switch SW-2.

When lever 140 is released by the operator, it is urged to its FIG. 1 position by spring 150. Lever 162 can then return to its FIG. 1 position. Slider 114 is moved to the left by tab 156 on lever 140 which engages the slider finger 158 and moves the slider with the lever.

Ordinarily the teeth 86 on cam 80 and the teeth on gears 90 and 92 will be brought into meshing engagement with each other in response to the movement of plate 94 in the manner descried hereinbefore. However, the gear teeth may be positioned with respect to each other so that the gear teeth do not mesh, i.e., the outer extremities of the teeth 86 are engaged by the outer extremities of the teeth on gear 90 and 92, such as being illustrated in FIG. 5 of the drawings. This relative position between the gear teeth could be changed by releasing the lever 140 and engaging the mechanism for adjusting zoom lens system since such adjustment also effects rotation of gears 90 and 92. However, with the mechanism of the invention this is not necessary because, after initial movement of slider assembly 114, the lever 140 can engage and move lever 162 to close switch SW-2 and energize the motor. When the motor is energized, gears 90 and 92 are rotated to bring the gear teeth into meshing engagement with teeth 86. This is made possible by the spring 160 which establishes an elastic connection between lever 140 and slider assembly 114.

Figure 8:
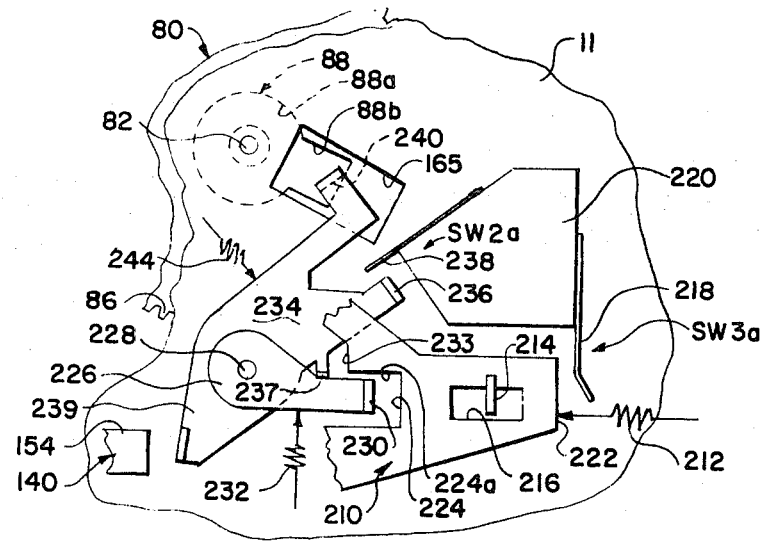
FIGS. 8-10 are fragmentary views illustrating the embodiment of the invention.
Figure 9:
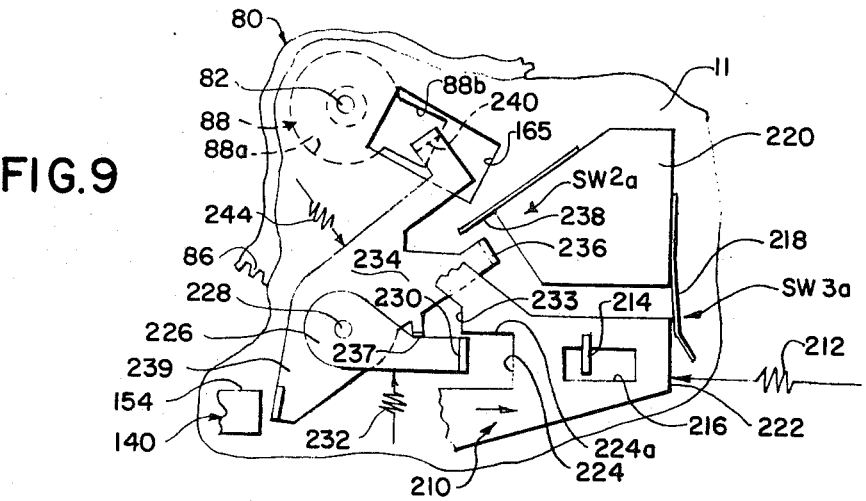
Figure 10:
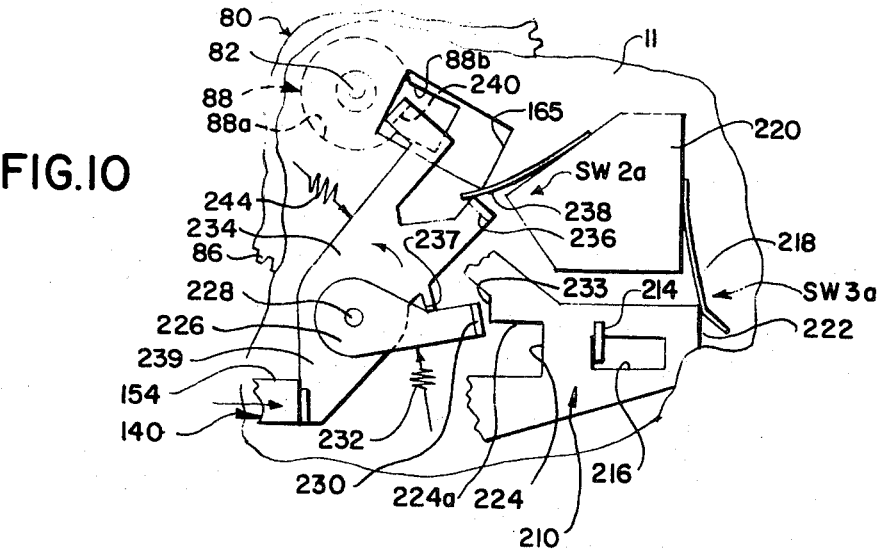

Referring now to the embodiment of the invention illustrated in FIGS. 8–10, a slider assembly generally designated 210 is similar to the assembly 114 described hereinbefore. Thus assembly 210 is resiliently urged to the right by spring means (such as spring 160) in response to the camera operator depressing lever 140, and the assembly is urged to the left upon release of lever 140 by the biasing force exerted by a spring shown diagrammatically at 212. Movement of the slider assembly to the right is limited by a stop 214 which projects through an opening 216 in slider assembly 210, the stop being mounted on mechanism plate 11, for example. Movement of the slider assembly to the position illustrated in FIG. 9 closes a switch designated SW-3a comprising a contact member 218 mounted on a suitable support member 220 and a contact member defined by the right end 222 of the slider assembly. Switch SW-3a is connected in a circuit to the exposure control assembly of the camera in the manner described hereinbefore in connection with switch SW-3.

Slider assembly 210 has a notch 224 which opens to its left end and is elongated in the same direction as the slider normally moves. A lever 226 is mounted on a pin 228 for pivotal movement about the axis of the pin. A tab 230 at one end of lever 226 projects upwardly into the notch 224 in the slider assembly when the slider assembly is in the position illustrated in FIG. 8. The edge 224a of notch 224 prevents counterclockwise movement of the lever 226 about pin 228 until such time as the slider assembly moves to the right past its FIG. 9 position to its FIG. 10 position. The length of notch 224 in slider assembly 210 is such that the switch SW-3a is closed before the tab 230 is clear of the left end of the notch. The lever is urged upwardly by a spring diagrammatically shown at 232.

Another lever 234 is mounted on pin 228 beneath lever 226 for pivotal movement about the pin. Lever 234 comprises a tab 236 defining a switch contact which is engageable with another switch contact 238 mounted on support 220 when the lever swings from its FIG. 8 to its FIG. 10 position. Contacts 236 and 238 define a switch SW-2a that can be connected in a circuit to motor 32 in a manner shown for switch SW-2 in FIG. 7. A lug 237 on lever 234 projects upwardly from the lower side edge of the lever into the plane of lever 226 and adjacent the upper edge of lever 226 so that the lever 226 is moved clockwise with lever 234 as the lever 234 is swung from its FIG. 10 to its FIG. 8 position.

Lever 234 includes a tab 240 which projects downwardly through opening 165 in plate 11. Tab 240, like tab 164, cooperates with released portion 88 in cam 80 to permit the cam to stop only when the shutter is across the optical path and between the lens system and the film.

Lever 234 has a flange 239 projecting into the path of movement of finger 154 of the trigger lever 140 so that the lever is swung from its FIG. 8 to its FIG. 10 position when the trigger lever is depressed. The various parts are arranged with respect to each other so that normally the slider 210 moves to close switch SW-3a, then lever 234 is swung to its FIG. 10 position (closing switch SW-2a), and then lever 226 is released by slider 210 and swung by spring 232 to the position shown in FIG. 10 wherein lever 226 blocks movement of the slider 210 to the left (and thereby prevents uncoupling of the gear drive to cam 80) until tab 240 enters recess portion 88b on the cam under the influence of spring 244.

When trigger lever 140 is released at the end of a sequence of filming, slider assembly 210 is urged to left by spring 212. Such movement of the slider assembly is provided initially due to the engagement between the tab 230 on lever 226 and the edge 233 of the slider assembly immediately above the notch 224. However, when the lug 240 on lever 234 becomes aligned with the portion 88b of the recess in the cam, lever 234 swings to the right under the influence of spring 244 to bring the tab into the recess portion 88b. As this clockwise motion of lever 234 occurs, switch SW-2a is opened, and the lug 237 on lever 234 moves lever 226 downwardly from its FIG. 10 position to its FIG. 8 position, thereby bringing the tab 230 into alignment with the notch 224. This releases the slider assembly 210 and permits it to move to the left under the biasing force exerted by spring 212. Thus the slider assembly returns to its FIG. 8 position and switch SW-3a is opened. This movment of the slider assembly disengages gears 90 or 92 from the gear teeth on the cam member.

Figure 5:
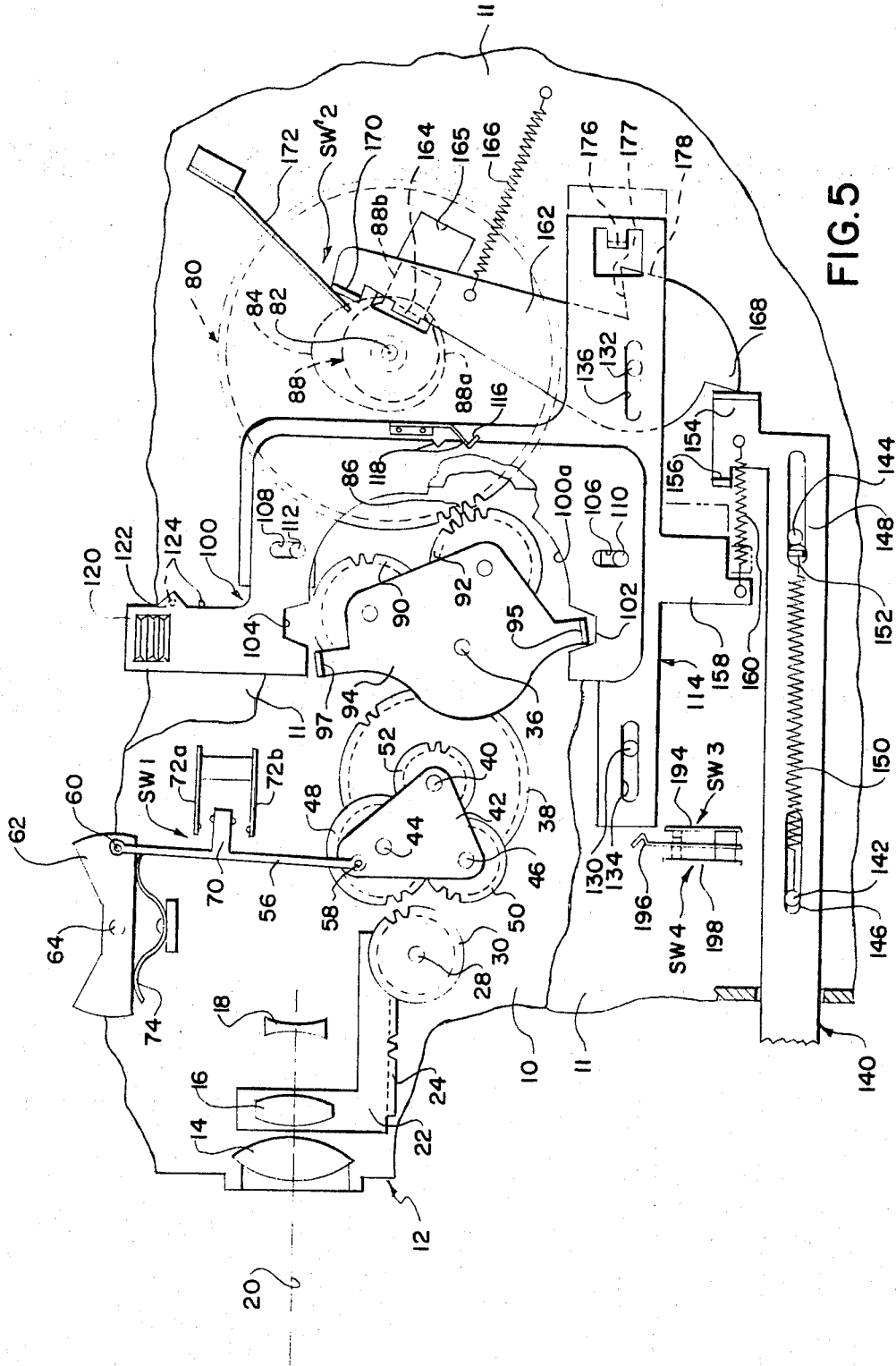
FIG. 5 is a view similar to FIG. 1 but showing the gears for the film advance means in a position that occasionally occurs.
Figure 6:
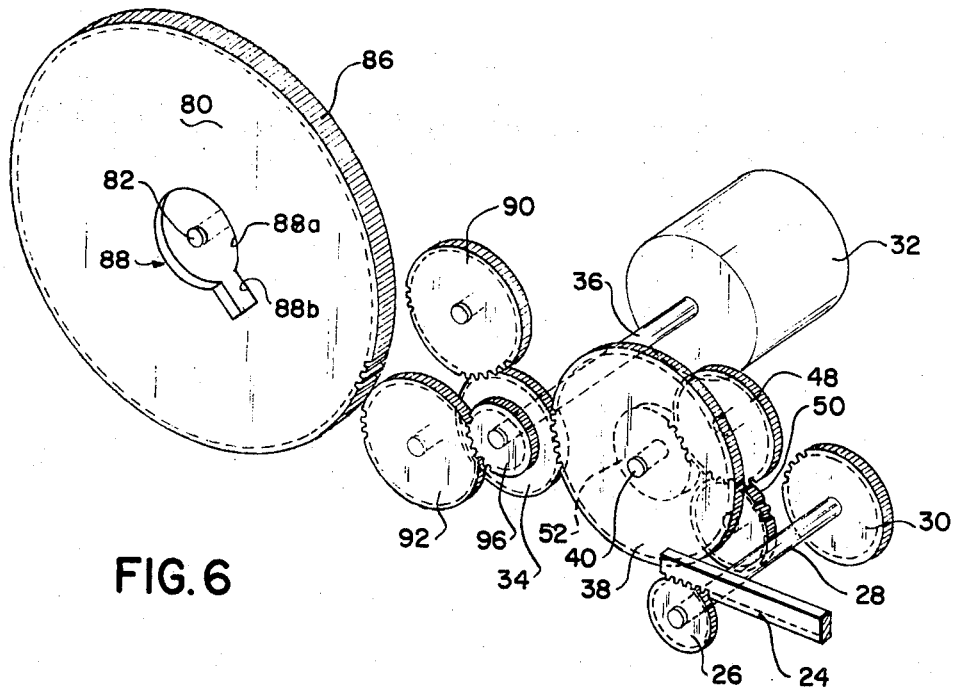
FIG. 6 is a perspective view of certain elements of the drive mechanism of the invention.

Because levers 226 and 234 are independently movable in a counterclockwise direction as explained hereinbefore, lever 234 can be swung to the position illustrated in FIG. 20 to close switch SW-2a and thereby energize motor 32 for driving gears 90 or 92 even in those rare situations when the tops of the gear teeth engages each other as shown in FIG. 5 rather than mesh in a normal driving relation. In the absence of such independent movement, the slider assembly 210 could not move to the right by a sufficient distance to permit lever 226 to move upwardly until such time as the gears properly meshed. This avoids the necessity of having to drive gear 90 or 92 by operation of the zoom drive mechanism in order to adjust the relative position of gear teeth with the teeth 86 on the cam. Also, the drive for the film advance mechanism can be used on cameras that do not incorporate zoom drive mechanisms, thereby making very desirable the provisions of some means (such as shown in FIG. 8–10) for independently operating the motor before meshing engagement of the gears occurs.

The invention has been described in detail with particular reference to preferred embodiments thereof, but it will be understood that variations and modifications can be effected within the spirit and scope of the invention.

We claim:
1. A drive mechanism for a motion picture camera having a motor, the mechanism comprising:
   a cam member having a plurality of gear teeth thereon engageable by a gear for rotation of the cam member;
   a shaft rotatable about an axis and coupled to the motor for rotation of the shaft by the motor;
   first and second gears mounted on said shaft for rotation with said shaft;
   gear mounting means mounted for pivotal movement about said axis;
   third and fourth gears mounted on said mounting means for rotation about axes spaced from each other and from the axis of said shaft, said third and fourth gears being in meshing engagement with said first and second gears, respectively, the third and fourth gears being mounted relative to the cam member so that movement of the mounting means is effective to bring either the third gear or the fourth gear into engagement with the teeth on the cam member thereby to drive the cam member from the motor, the first and third gears comprising a first gear train that is effective to drive the cam member at a first rate and the second and third gears defining a second gear train that is effective to drive the cam member at a second rate; and
   camera operating means coupled to said gear mounting means for selectively coupling either the first drive train or the second drive train to the cam member, said camera operating means comprising a slider assembly movable between a first position and a second position, and a speed control member coupled to said slider assembly and to said gear mounting means, said control member having two spaced notches, and said gear mounting means having two spaced tabs positionable in said notches, said control member being adjustable with respect to said slider assembly between (1) a first position wherein one of said tabs is positioned within one of said notches to effect movement of said gear mounting means in one direction about the axis of said motor in response to movement of the slider assembly from its first position to its second position and (2) a second position wherein the other of said tabs is positioned within the other of said notches to effect movement of the gear mounting means in the opposite direction about the axis of the motor in response to movement of the slider assembly from its first position to its second position, whereby movement of the slider assembly to its second position from its first position moves the gears on said gear mounting means to bring either the third gear or the fourth gear into engagement with the teeth on the cam member.

2. A drive mechanism as set forth in claim 1 wherein the motor is an electric motor connectable in a first circuit to a source of electrical potential, the camera further comprising a second circuit including automatic exposure control means connectable to a source of electrical potential, the expsure control means and the motor being in parallel to each other, and said circuits having switch means sequentially operable by the camera operating means for first closing the second circuit to the exposure control means and then closing the first circuit to the motor.

3. A drive mechanism as set forth in claim 1 further comprising means biasing said slider assembly toward its first position from its second position, and an operating lever having a first portion engageable by a camera operator, and means effecting a resilient connection between said lever and said slider assembly so that the slider assembly is urged toward its second position from its first position in response to movement of the lever by the camera operator.

* * * * *

PO-1050
(5/69)

UNITED STATES PATENT OFFICE
CERTIFICATE OF CORRECTION

Patent No. __3,781,100__  Dated __December 25, 1973__

Inventor(s) Gerald L. Jenkins, Vernon H. Jungjohann, Edgar S. Marvin, Neil G. Seely It is certified that error appears in the above-identified patent and that said Letters Patent are hereby corrected as shown below:

Col. 3, line 66   "or" should be --of--

Col. 4, line 39   "abouts" should be --about--

Col. 7, line 6    "circular" should be --circuit--

Col. 7, line 52   "whereby" should be --thereby--

Col. 8, line 14   "14" should be --114--

Col. 9, line 49   "the" should be --a--

Col. 10, line 1   "membrane" should be --member--

Col. 10, line 52  "assembly" should be --system--

Col. 11, line 40  "provided" should be --prevented--

Col. 11, line 61  "20" should be --10--

Col. 12, line 41  "third" should be --fourth--

Signed and sealed this 23rd day of April 1974.

(SEAL)
Attest:

EDWARD M. FLETCHER, JR.
Attesting Officer

C. MARSHALL DANN
Commissioner of Patents